United States Patent
Bai et al.

(10) Patent No.: US 9,967,354 B2
(45) Date of Patent: May 8, 2018

(54) CACHE REFRESHING FOR ONLINE SOCIAL NEWSFEEDS

(71) Applicant: Excalibur IP, LLC, New York, NY (US)

(72) Inventors: Xiao Bai, Barcelona (ES); Flavio P. Junqueira, Barcelona (ES); Adam Silberstein, Sunnyvale, CA (US)

(73) Assignee: Excalibur IP, LLC, New York, NY (US)

( * ) Notice: Subject to any disclaimer, the term of this patent is extended or adjusted under 35 U.S.C. 154(b) by 729 days.

(21) Appl. No.: 14/038,727

(22) Filed: Sep. 26, 2013

(65) Prior Publication Data
US 2015/0088990 A1    Mar. 26, 2015

(51) Int. Cl.
G06F 15/16    (2006.01)
H04L 29/08    (2006.01)

(52) U.S. Cl.
CPC .............. H04L 67/22 (2013.01); H04L 67/26 (2013.01); H04L 67/28 (2013.01)

(58) Field of Classification Search
CPC ................................ H04L 67/22; H04L 67/26
USPC .................................................. 709/718, 204
See application file for complete search history.

(56) References Cited

U.S. PATENT DOCUMENTS

| 2011/0022621 A1* | 1/2011 | Luo ........................ G06Q 30/02 707/769 |
| 2013/0124542 A1* | 5/2013 | Lee ................... G06F 17/30392 707/751 |

* cited by examiner

*Primary Examiner* — Dustin Nguyen
*Assistant Examiner* — Joel Mesa
(74) *Attorney, Agent, or Firm* — Martine Penilla Group, LLP

(57) ABSTRACT

Software for an online social service receives a request for a newsfeed from a user. The newsfeed depends at least in part on a memory-cached list of social friends of the user and on a memory-cached list of events associated with each social friend. The software refreshes a memory-cached copy of the list of social friends from a corresponding list in a persistent data store, based upon a determination of a utility associated with the user. And the software refreshes a memory-cached copy of a list of events associated with a social friend from a corresponding list of events in a persistent data store, based upon a determination of a utility associated with the social friend. Then the software causes the newsfeed to be displayed to the user.

18 Claims, 14 Drawing Sheets

US 9,967,354 B2

CACHE REFRESHING FOR ONLINE SOCIAL NEWSFEEDS

BACKGROUND

As computing has become more mobile, client devices have shrunk in size, leaving little "real estate" on which to display text, images, and videos. Such client devices tend to be an awkward fit for the WIMP (Windows, Icons, Menus, Pointer) style of human-computer interaction.

During the same period of time, services based on social graphs and services based on interest graphs have grown in popularity. An example of the former is Facebook. An example of the latter is Twitter.

Both types of services broadcast user-generated content to other users using a graphical user interface (GUI) control called a newsfeed or stream, which is scrollable with a finger on a mobile device with a touch screen, such as a smartphone or tablet.

Other types of services present content to users using newsfeeds or streams. Yahoo! News is a content-aggregation service with social features and it presents content, much of which is not user-generated, to users using a newsfeed or stream.

Consequently, functionality for presenting newsfeeds or streams is an area of ongoing research and study.

SUMMARY

In an example embodiment, a processor-executed method is described. According to the method, software for an online social service receives a request for a newsfeed from a user. The newsfeed depends at least in part on a memory-cached list of social friends of the user and on a memory-cached list of events associated with each social friend. The software refreshes a memory-cached copy of the list of social friends from a corresponding list in a persistent data store, based upon a determination of a utility associated with the user. And the software refreshes a memory-cached copy of a list of events associated with a social friend from a corresponding list in a persistent data store, based upon a determination of a utility associated with the social friend. Then the software causes the newsfeed to be displayed to the user.

In another example embodiment, an apparatus is described, namely, a computer-readable storage medium which persistently stores a program. The program might be a module in software for an online social service. The program receives a request for a newsfeed from a user. The newsfeed depends at least in part on a memory-cached list of social friends of the user and on a memory-cached list of events associated with each social friend. The program refreshes a memory-cached copy of the list of social friends from a corresponding list in a persistent data store, based upon a determination of a utility associated with the user. And the program refreshes a memory-cached copy of a list of events associated with a social friend from a corresponding list in a persistent data store, based upon a determination of a utility associated with the social friend. Then the program causes the newsfeed to be displayed to the user.

Another example embodiment also involves a processor-executed method. According to the method, software for an online social service receives a request for a newsfeed from a user. The newsfeed depends at least in part on a memory-cached list of social friends of the user and on a memory-cached list of events associated with each social friend. The software refreshes a memory-cached copy of the list of social friends from a corresponding list in a persistent data store, based at least in part on a rate of addition of friends by the user and a rate of removal of friends by the user. And the software refreshes a memory-cached copy of a list of events associated with a social friend from a corresponding list in a persistent data store, based at least in part on a rate of generation of events by the social friend. Then the software causes the newsfeed to be displayed to the user.

Other aspects and advantages of the inventions will become apparent from the following detailed description, taken in conjunction with the accompanying drawings, which illustrate by way of example the principles of the inventions.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Figure 1:
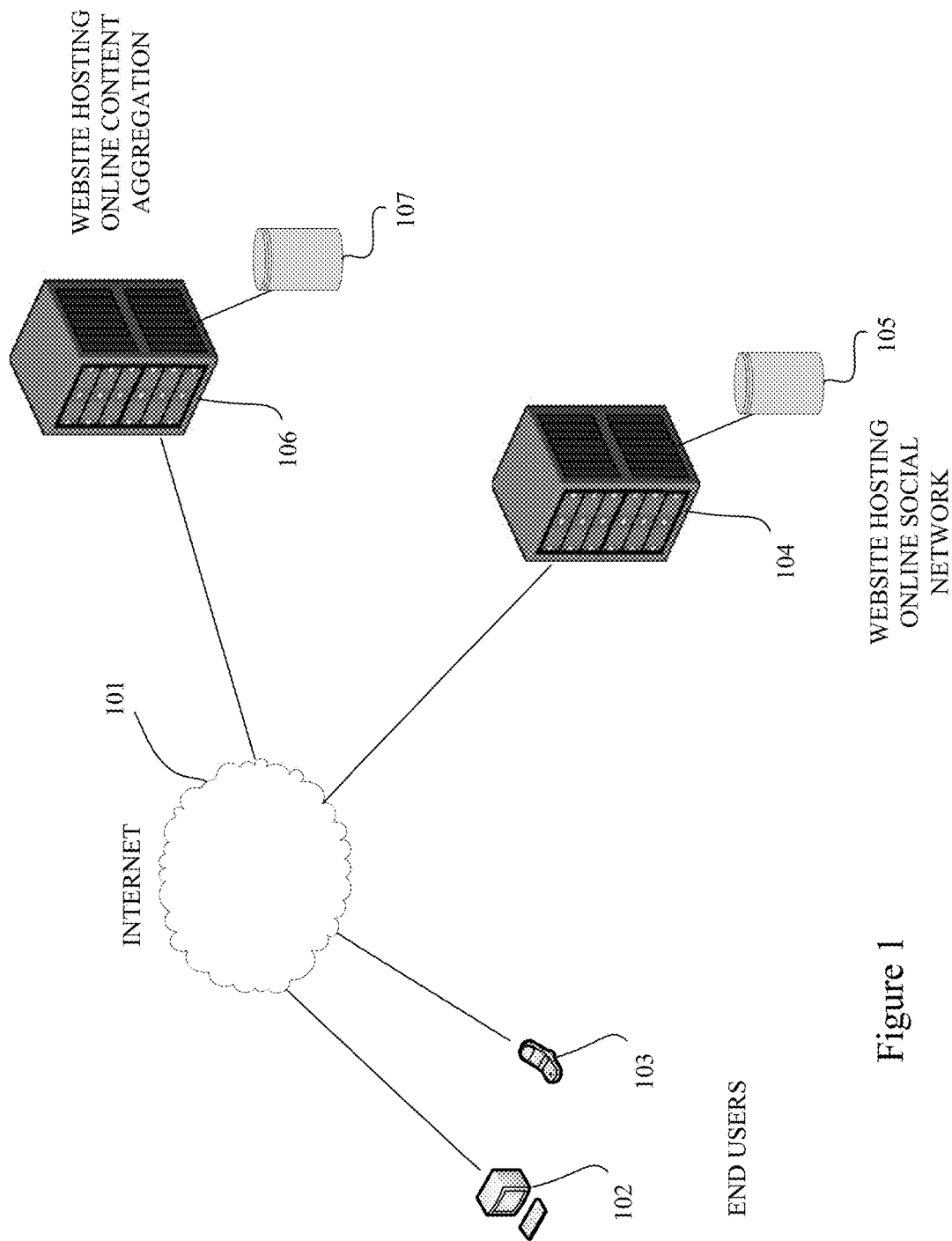
FIG. 1 is a network diagram showing a website hosting an online social network and a website hosting online content aggregation, in accordance with an example embodiment.

FIG. 1 is a network diagram showing a website hosting an online social network and a website hosting online content aggregation, in accordance with an example embodiment. As depicted in this figure, a personal computer 102 (e.g., a laptop or other mobile computer) and a mobile device 103 (e.g., a smartphone such as an iPhone, Android, Blackberry, etc., or a tablet computer such as an iPad, etc.) are connected by a network 101 (e.g., a wide area network (WAN) including the Internet, which might be wireless in part or in whole) with a website 104 hosting an online social network and a website 106 hosting online content aggregation. As used here and elsewhere in this disclosure, the term "online social network" is to be broadly interpreted to include, for example, any online service, including a social-media service, that allows its users to, among other things, (a) selectively access (e.g., according to a friend list, contact list, buddy list, social graph, or other control list) content (e.g., text, including hyperlinks, images, videos, audio recordings, etc.) associated with each other's profiles (e.g., content stocks including Facebook walls, Flickr photo albums, Pinterest boards, etc.); (b) selectively (e.g., according to a friend list, contact list, buddy list, social graph, distribution list, or other control list) broadcast content (e.g., text, including hyperlinks, images, videos, audio recordings, etc.) to each other's newsfeeds (e.g., content flows including content/activity streams such as Facebook's News Feed, Twitter's Timeline, Google Plus's Stream, etc.); and/or (c) selectively communicate (e.g., according to a friend list, contact list, buddy list, social graph, distribution list, or other control list) with each other (e.g., using a messaging protocol such as email, instant messaging, short message service (SMS), etc.). And as used in this disclosure, the term "online content aggregation" is to be broadly construed to include any online service, including a social-media service, that allows its users to, among other things, access and/or annotate (e.g., comment) content (e.g., text, including hyperlinks, images, videos, audio recordings, etc.) generated by the online service (e.g., using its own curators and/or its own algorithms) and/or its users and presented in a newsfeed (e.g., a content flow). Yahoo! News is an example of such an online service. It will be appreciated that many websites hosting online content aggregation have social features based on a friend list, contact list, buddy list, social graph, distribution list, or other control list. For example, as described in further detail below, Yahoo! News identifies the content items in its newsfeed that have been viewed/read by a user's friends.

In an example embodiment, websites 104 and 106 might be composed of a number of servers (e.g., racked servers) connected by a network (e.g., a local area network (LAN) or a WAN) to each other in a cluster (e.g., a load-balancing cluster, a Beowulf cluster, a Hadoop cluster, etc.) or other distributed system which might run website software (e.g., web-server software, database software, search-engine software, etc.), and distributed-computing and/or cloud software such as Map-Reduce, Google File System, Hadoop, Hadoop File System, Pig, Hive, Dremel, CloudBase, etc. The servers in website 104 might be connected to persistent storage 105 and the servers in website 106 might be connected to persistent storage 107. Persistent storage 105 and persistent storage 107 might include flash memory, a redundant array of independent disks (RAID), and/or a storage area network (SAN), in an example embodiment. In an alternative example embodiment, the servers in website 104 and website 106 and/or the persistent storage in persistent storage 105 and persistent storage 106 might be hosted wholly or partially in a public and/or private cloud, e.g., where the cloud resources serve as a platform-as-a-service (PaaS) or an infrastructure-as-a-service (IaaS).

Persistent storage 105 and persistent storage 107 might be used to store data related content (e.g., text, including hyperlinks, images, videos, audio recordings, etc.) and data related to friend lists of users, as well as software including algorithms and other processes for presenting the content to the users in a newsfeed (which might be chronological and/or based on an interestingness algorithm such as Facebook's EdgeRank), including the memory-caching processes described below.

In an example embodiment, those processes might use a persistent data store that maintains two data structures: a friendship store and an event store. In the friendship store, each user $u_i$ has a set of friends in the form of $\{u_i, tf_{ij}, u_j\}$, where $tf_{ij}$ is the time when user $u_j$ becomes a friend of user $u_i$. A friendship entry is added or removed from the friendship store if user $u_i$ adds or removes a friend. In the event store, each user $u_i$ has a set of events with elements of the form of $\{u_i, te_{il}, even y_l(u_i)\}$, where $te_{il}$ is the timestamp when user $u_i$ generates $event_l(u_i)$. An event entry is added to the event store when user $u_i$ generates an event.

In this example embodiment, the newsfeed of user $u_i$ at time $tr_i$ can be obtained by joining event and friendship entries such that for each $\{u_j, te_{jl}, event_l(u_j)\}$, $te_{jl} \leq tr_i$, in the newsfeed, there exists a friendship entry $\{u_i, tf_{ij}, u_j\}$, $tf_{ij} \leq tr_i$, and $te_{jl}$ is the maximum timestamp that satisfies $te_{jl} \leq tr_i$ for user $u_j$, while for any every entry $\{u_g, te_{gh}, event_h(u_g)\}$, $te_{gh} \leq tr_i$, which is not in the newsfeed but corresponds to a friendship entry $(u_i, tf_{ig}, u_g)$, $tf_g \leq tr_i$, $te_{gh}$ is not larger than the minimum $te_{jl}$ in the newsfeed. Then the process of generating the newsfeed from the caches involves finding the event entries with the k maximum $te_{jl}$ for a user $u_i$'s friends on $u_i$'s friendship flist($u_i$, $tcf_i$). To avoid scanning the persistent data store at each request to update a newsfeed, the process requests against an in-memory cache. A newsfeed request is forwarded to the persistent data store when the data is not available in the in-memory cache. As discussed below, this is called a "cache miss".

Figure 2:
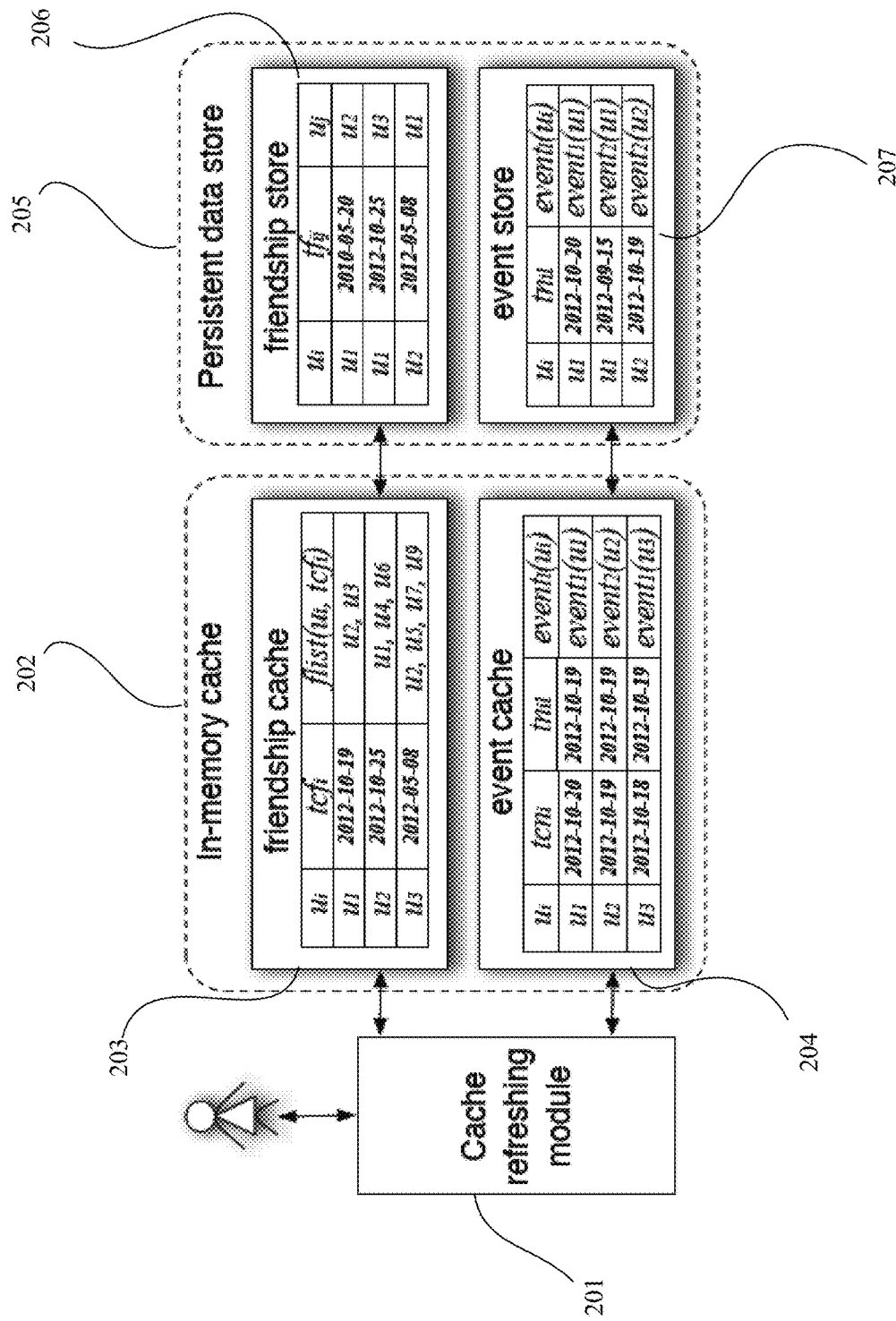
FIG. 2 is a diagram showing a cache-refreshing module and an in-memory cache, in accordance with an example embodiment.

The in-memory cache and persistent data store structures for this example and other example embodiments are shown in greater detail in FIG. 2. As depicted in this figure, a cache-refreshing module 201 (e.g., one or more software programs running on one or more servers at website 104 or website 106) controls the refreshing of data in an in-memory cache 202 from a persistent data store 205. As used in this disclosure, memory refers to volatile storage, e.g., storage that requires electrical power to maintain any data that it stores. Persistent storage (or persistent data store) refers to storage that can maintain any data it stores without electrical power. In an example embodiment, the in-memory cache 202 might be a cache in memory (e.g., main memory or RAM) which is implemented using a distributed version of the memcache program, e.g., memcached. It will be appreciated that caches, including in-memory caches, can improve the performance of processor operations (e.g., processor operations that present content in newsfeeds) by exploiting the principle of locality of reference in a hierarchical storage system (e.g., with fast but expensive CPU registers at the top, memory such as main memory (e.g., RAM) in the middle, and slow but inexpensive persistent storage such as flash memory or hard disk at the bottom). It will be appreciated that in such a hierarchical storage system, a processor (or other integrated circuit) can access (read or write) data in memory much more readily than data in persistent storage. And if that data is going to be used proximately in terms of time, performance of the operations can be improved by storing the data in memory rather than in persistent storage.

As shown in FIG. 2, the data in in-memory cache 202 includes data in a friendship cache 203 and data in an event cache 204, in an example embodiment. The data in the friendship cache 203 might be thought of as structured as a table where the rows are associated with individual users ($u_i$) and the columns are a timestamp ($tcf_i$) and a friendship list that depends on the individual user and the timestamp ($flist(u_i, tcf_i)$). That is to say, $flist(u_i, tcf_i)$ identifies the friends of user $u_i$ at time $tcf_i$. In an example embodiment, the timestamp $tcf_i$ is the time when $flist(u_i, tcf_i)$ was last updated in friendship cache 203. Thus, the row for user $u_i$ includes a timestamp of 2012-10-19 and a friendship list of $u_2$ and $u_3$. In an alternative example embodiment, the timestamps in the in-memory cache and the persistent data store might be expressed in terms of hours, minutes, seconds, etc., instead of days.

In an example embodiment, the friendship cache 203 is updated from a friendship store 206 in persistent data store 205. Here again, the data in the friendship store 206 might be thought of as structured as a table where the rows are associated with individual users ($u_i$) and the columns are a timestamp ($tf_{ij}$) and a friend ($u_j$). Thus, the row for user $u_i$ includes a timestamp of 2010-05-20 which records the time when the user $u_i$ added the friend $u_j$. It will be appreciated that such a row will not appear if the user $u_i$ removes the friend $u_j$ and does not subsequently re-add the friend $u_j$.

Similarly, the data in the event cache 204 might be thought of as structured as a table where the rows are associated with individual users ($u_i$) and the columns are two timestamps, ($tcn_i$) and ($tn_{il}$), and an $event_l(u_i)$ that depends on the individual user. The timestamp $tn_{il}$ records when the user $u_i$ generated $event_l$, e.g., a single event or a bundle of events (e.g., bundled at periodic intervals such as every day). The timestamp $tcn_i$ records when the $event_l$ was updated in the event cache 204. Thus, the row for user $u_i$ includes a timestamp of 2012-10-20 (update in event cache), a timestamp 2012-10-19 (event generated), and an $event_l(u_i)$.

In an example embodiment, the event cache 204 is updated from an event store 207 in persistent data store 205. Here again, the data in the event store 207 might be thought of as structured as a table where the rows are associated with individual users ($u_i$) and the columns are a timestamp ($tn_{il}$) and an $event_l(u_i)$. The timestamp $tn_{il}$ records the time when the $event_l$ was generated by the user e.g., a single event or a bundle of events (e.g., bundled at periodic intervals such as every day). Thus, the row for user $u_1$ includes a timestamp of 2012-10-20 which records the time when the user $u_i$ generated the $event_l$. Here again, the timestamps in the in-memory cache and the persistent data store might be expressed in terms of hours, minutes, seconds, etc., instead of days, in an alternative example embodiment.

It will be appreciated that a table is logically equivalent to a record (e.g., a class or a struct). So in an alternative example embodiment, friendship cache 203, event cache 204, friendship store 206, and event store 207 might be structured as lists (which might initially be null lists) or arrays (which might initially be empty) of records rather than tables. Indeed, other data structures might also be used for these caches and stores. The examples given are intended to be illustrative, rather than limiting.

Figure 3:
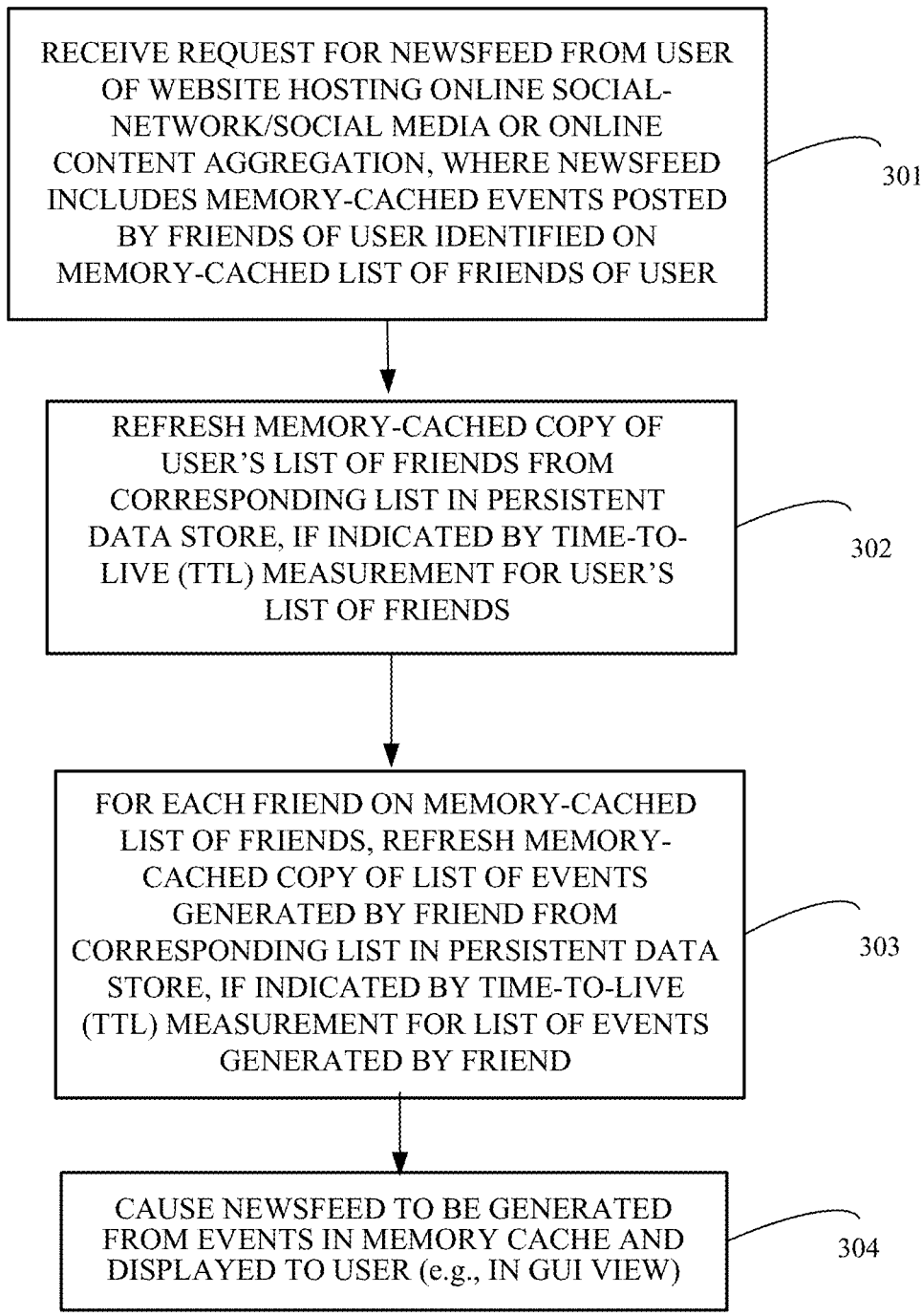
FIG. 3 is a flowchart diagram that illustrates a process for refreshing an in-memory cache of a list of friends and their generated events using a time-to-live (TTL) approach, in accordance with an example embodiment.

FIG. 3 is a flowchart diagram that illustrates a process for refreshing an in-memory cache of a list of friends and their generated events using a time-to-live (TTL) approach, in accordance with an example embodiment. In an example embodiment, this process might be performed by software running on website 104 or website 106 shown in FIG. 1. As depicted in FIG. 3, the software receives a request for a newsfeed from a user of a website hosting an online social network and/or social media or online content aggregation, in operation 301. In an example embodiment, the newsfeed includes the memory-cached events posted by friends of the user, as identified on a memory-cached list of friends of user. In operation 302, the software refreshes the memory-cached copy of the user's list of friends from a corresponding list in a persistent data store, if indicated by a time-to-live (TTL) measurement for the user's list of friends. For each friend on the memory-cached list of friends (which might have been refreshed), the software refreshes a memory-cached copy of the list of events generated by the friend from the corresponding list in persistent data store, if indicated by time-to-live (TTL) measurement for a list of events generated by the friend, in operation 303. Then, in operation 304, the software causes the newsfeed to be generated from the events in the memory cache and displayed to the user (e.g., in a GUI view).

In operations 302 and 303, the software performs a TTL measurement. In an example embodiment, the TTL measurement for operation 302 might involve calculating the difference between (a) the time ($tr_i$) of the user's request for a newsfeed ($tr_i$) and (b) the time ($tcf_i$) when the user's list of friends was last updated in the memory cache. If the difference is greater than a threshold, which might be greater than or equal to zero, the user's list of friends is refreshed, in an example embodiment. Similarly, in an example embodiment, the TTL measurement for operation 303 might involve calculating the difference between (a) the time ($tr_i$) of the user's request for a newsfeed ($tr_i$) and (b) the time ($te_j$) when the friend's list of events was last updated in the memory cache. If the difference is greater than a threshold, which might be greater than or equal to zero, the friend's list of events is refreshed, in an example embodiment.

It will be appreciated that a "pull" approach to generating a newsfeed is used in the operations shown in FIG. 3. That is to say, the newsfeed is generated from the events in the memory cache when the user requests a newsfeed. However, the refreshing operations 302 and 303 might also be used with a "push" approach to generating a newsfeed, where the newsfeed is materialized in advance of any user request for a newsfeed, as described in Adam Silberstein et al., *Feeding Frenzy Selectively Materializing Users' Event Feeds*, SIGMOD'10 (Jun. 6-11, 2010), which is incorporated herein by reference.

Figure 4:
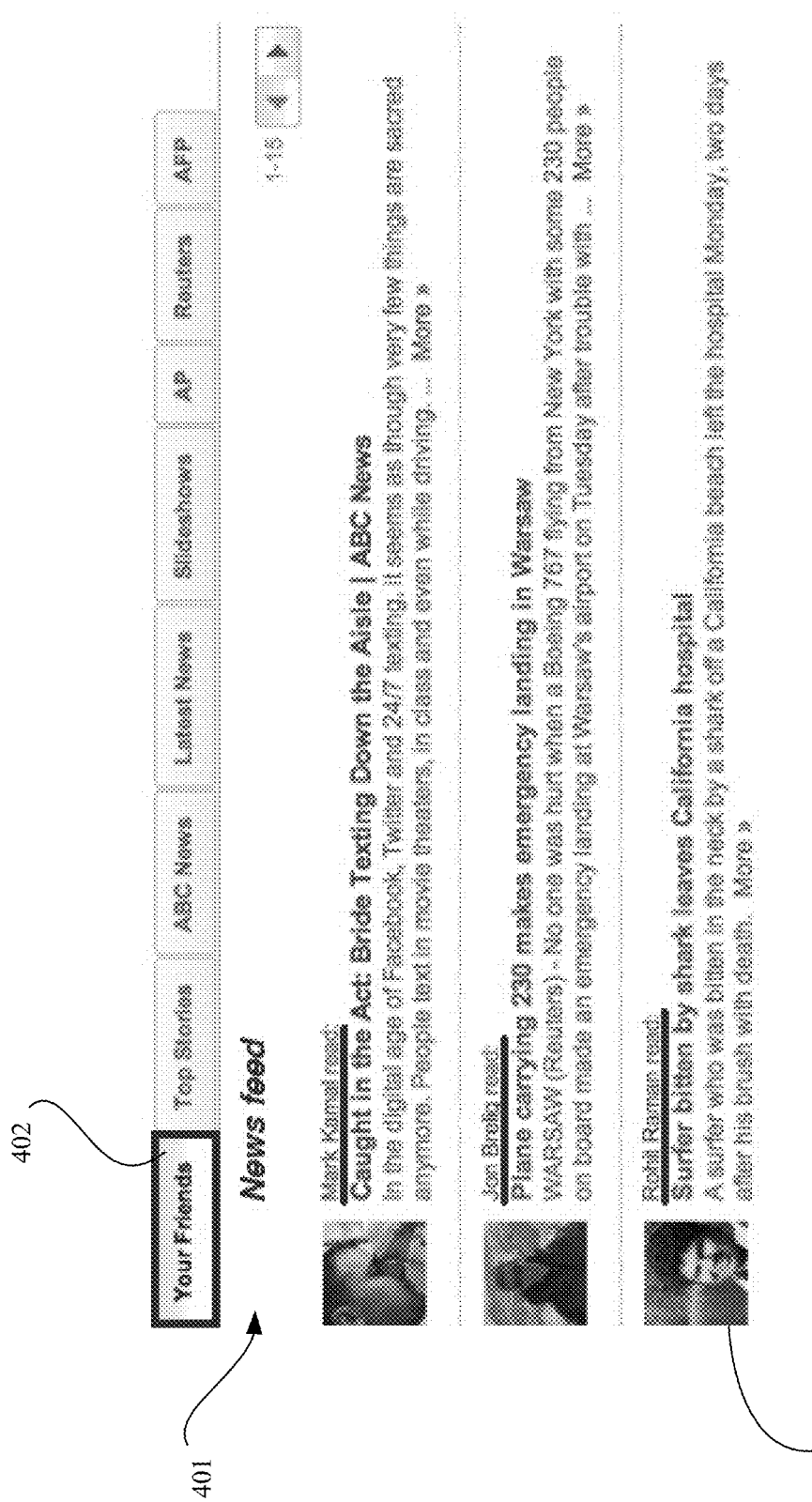
FIG. 4 shows a tab served as a view in graphical user interface (GUI) by a website hosting online content aggregation, in accordance with an example embodiment.

FIG. 4 shows a tab served as a GUI view by a website hosting online content aggregation, in accordance with an example embodiment. An example of such a website is Yahoo! News, which aggregates content including articles from online publications. It will be appreciated that such a GUI view might be presented by software performing operation 304 in FIG. 3 above or operation 504 below. As shown in FIG. 4, a GUI view 401 labeled "News feed" includes a tab 402 labeled "Your Friends". Tab 402 includes three events generated by friends of the user viewing the GUI view. Each of the three events involves the reading (or viewing) of an article by a friend (as identified on a list of friends) of the user. For example, event 403 occurred (or was generated) when a friend of the user named Rohit Raman read an article entitled "Surfer bitten by shark leaves California hospital". It will be appreciated that an event similar to this event might have also been displayed in a newsfeed presented by an online social network such as Facebook.

Figure 5:
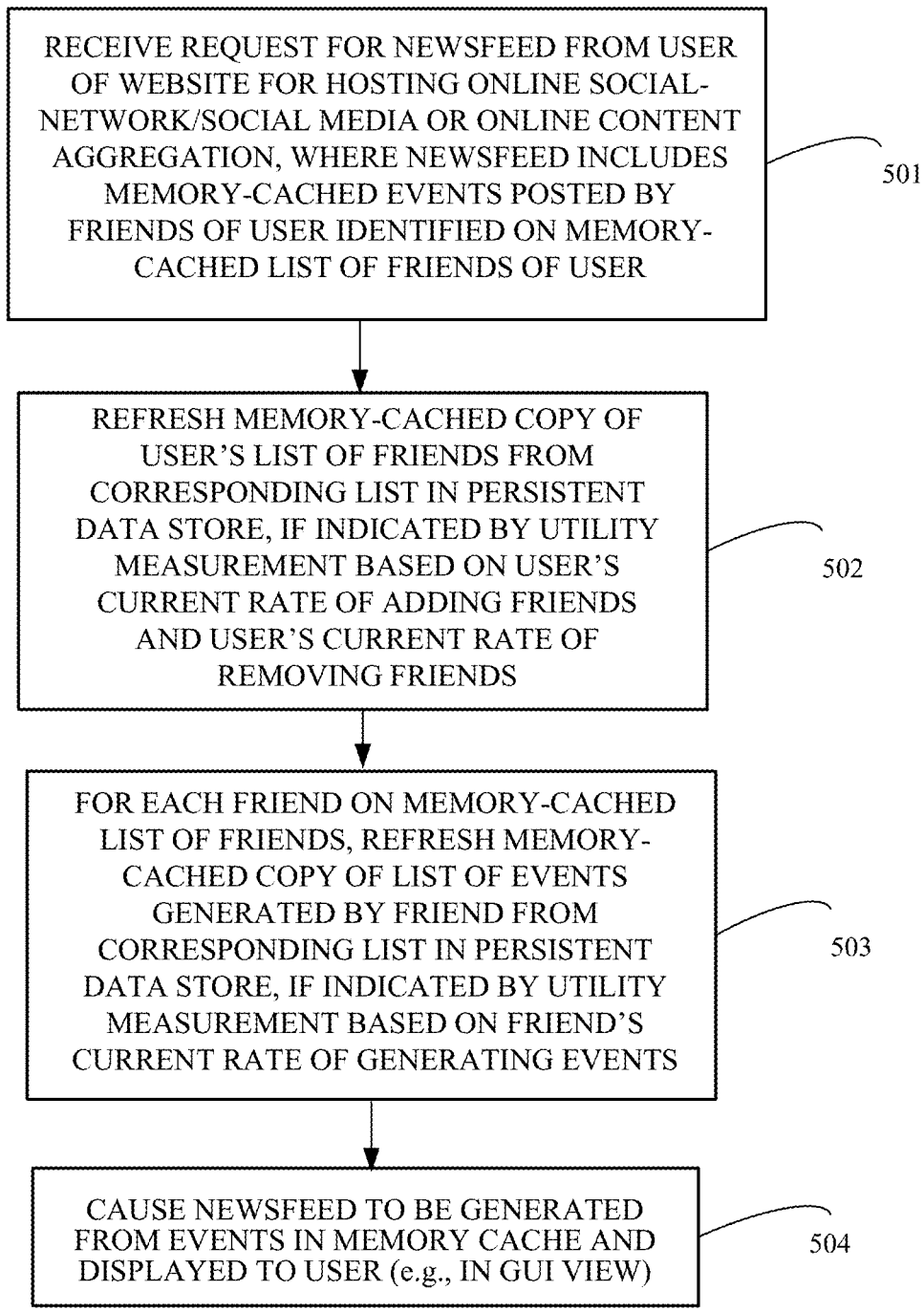
FIG. 5 is a flowchart diagram that illustrates a process for refreshing an in-memory cache of a list of friends and their generated events using a utility approach.

FIG. 5 is a flowchart diagram that illustrates a process for refreshing an in-memory cache of a list of friends and their generated events using a utility approach. In an example embodiment, this process might be performed by software running on website 104 or website 106 shown in FIG. 1. As depicted in FIG. 5, the software receives a request for a newsfeed from a user of a website hosting an online social network and/or social media or online content aggregation, in operation 501. In an example embodiment, the newsfeed includes the memory-cached events posted by friends of the user, as identified on a memory-cached list of friends of user. In operation 502, the software refreshes the memory-cached copy of the user's list of friends from a corresponding list in a persistent data store, if indicated by a utility measurement based on the user's current rate of adding friends and the user's current rate of removing friends. For each friend on the memory-cached list of friends (which might have been refreshed), the software refreshes a memory-cached copy of the list of events generated by the friend from the corresponding list in persistent data store, if indicated by a utility measurement based on the friend's current rate of generating events, in operation 503. Then, in operation 504, the software causes the newsfeed to be generated from the events in the memory cache and displayed to the user (e.g., in a GUI view).

Here again it will be appreciated that a "pull" approach to generating a newsfeed is used in the operations shown in FIG. 5. That is to say, the newsfeed is generated from the events in the memory cache when the user requests a newsfeed. However, the refreshing operations 502 and 503 might also be used with a "push" approach to generating a newsfeed, where the newsfeed is materialized in advance of any user request for a newsfeed.

Figure 6:
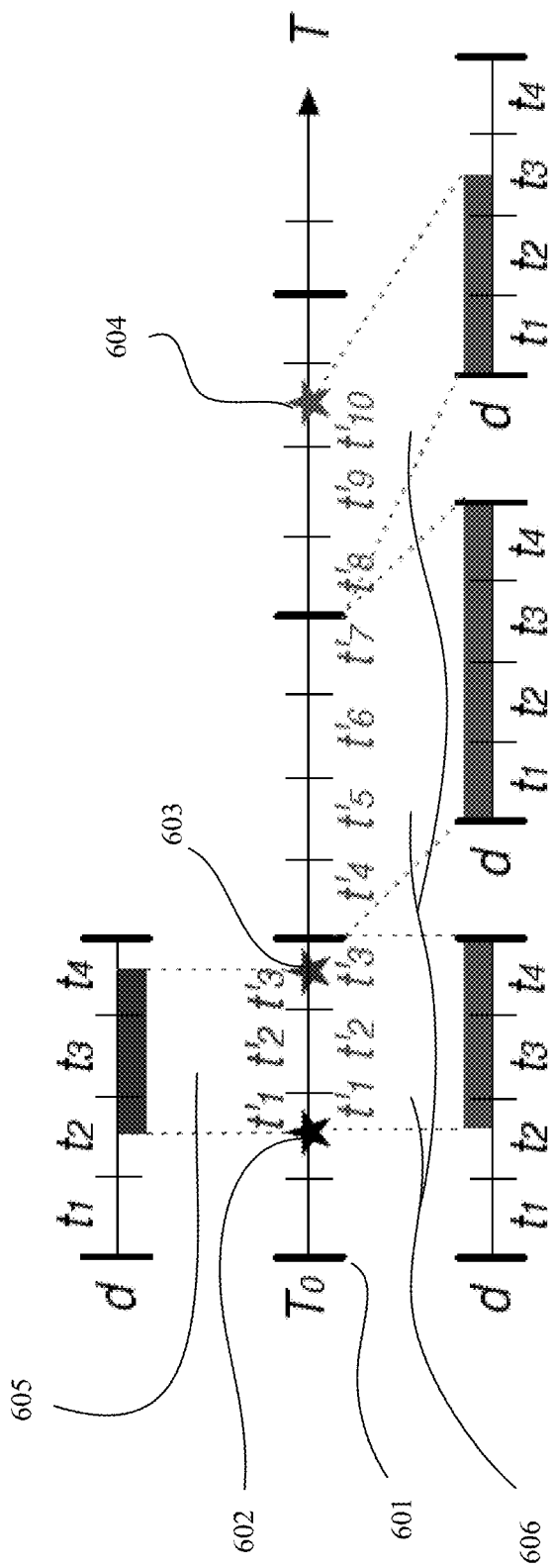
FIG. 6 is a diagram showing time intervals between the caching of event in an event cache and two separate requests for a newsfeed, in accordance with an example embodiment.

FIG. 6 is a diagram showing time intervals between the caching of event in an event cache and two separate requests for a newsfeed, in accordance with an example embodiment. As depicted in this figure, timeline 601 begins at $T_0$ with time increasing to the right. Star 602 represents the last update in an event cache for friend $u_j$ and stars 603 and 604 represent separate user requests for newsfeeds. The time periods $\{t_1, t_2, t_3, t_4\}$ are the time periods in a day d, which might be used in a formula for generating events eRate($u_j$, $t_j$), as described in further detail below. In an example embodiment, the time interval $p'=\{t'_1, t'_2, t'_3\}$ between the last update to the event cache and the user request 603 might be mapped to time periods $p=\{t_2, t_3, t_4\}$, as shown in mapping 605. Similarly, in an example embodiment, the time interval $p'=\{t'_1, t'_2, \ldots, t'_{10}\}$ between the last update to the event cache and the user request 604 might be mapped to time periods $\{t_2, t_3, t_4, t_1, t_2, t_3, t_4, t_1, t_2, t_3\}$, as shown in mapping 606.

Below are formulas for computing utility measurements, in accordance with an example embodiment. It will be appreciated that these formulas might be used with the operations (e.g., operations 502 and 503) shown in FIG. 5. It will also be appreciated that these formulas are intended to be illustrative, rather than limiting. The following formula shows how to calculate a combined utility measurement, Utility($u_i$, $tr_i$):

$$\text{Utility}(u_i, tr_i) = \text{UtilityFC}(u_i, tr_i) + \sum_{u_j \in \text{flist}(u_i, tcf_i)} \text{UtilityEC}(u_j, tr_i)$$

As shown in this formula, Utility($u_i$, $tr_i$) is the sum of (a) a utility measurement UtilityFC($u_i$, $tr_i$) associated with refreshing a memory-cached copy of a user's list of friends and (b) the sum, over all the friends on the user's list of friends, of a utility measurement UtilityEC($u_j$, $tr_i$) associated with refreshing a memory-cached copy of the events generated by a friend. As used in this formula, the symbols $u_i$, $tr_i$, and $u_j$ have the same meaning as defined above. It will be appreciated that Utility($u_i$, $tr_i$) might be used for short-circuit evaluation in conjunction with the operations shown in FIG. 5. For example, Utility($u_i$, $tr_i$) might be calculated prior to operations 502 and 503. And if Utility($u_i$, $tr_i$) is below some threshold (which might be zero), operations 502 and 503 might be skipped.

The following formula shows how to calculate a utility measurement UtilityFC($u_i$, $tr_i$) associated with refreshing a memory-cached copy of a user's list of friends:

$$\text{UtilityFC}(u_i, tr_i) = \text{fRate}_a(u_i) \times \text{avgERate} \times (tr_i - tcf_i)^2 + \text{fRate}_r(u_i) \times (tr_i - tcf_i) \times \frac{k}{|\text{flist}(u_i, tcf_i)|}$$

As shown in this formula, UtilityFC($u_i$, $tr_i$) is the sum of two terms. The first term is the product of fRate$_a$($u_i$), an avgERate, and $(tr_i - tcf_i)^2$, where fRate$_a$($u_i$) is the user's rate of adding friends and avgERate is an average of all the event-generating events available to the cache-refreshing module. As used in this formula, the symbol $tcf_i$ has the same meaning as defined above. As shown in the formula below, fRate$_a$($u_i$) is the product of two terms: (a) the reciprocal of the difference between two time periods, $tff_g$ and $tff_1$, and (b) the sum of users $u_i$ added as friends by user $u_i$ during that difference between two time periods:

$$\text{fRate}_a(u_i) = \frac{1}{tff_g - tff_1} \sum_{1 \leq l \leq g-1} \text{added}_l(u_i),$$

where $$\text{added}_l(u_i) = |\{u_j \mid u_j \notin \text{flist}(u_i, tff_l) \text{ and } u_j \in \text{flist}(u_i, tff_{l+1})\}|.$$

And as shown in the following formula, avgERate is also the product of two terms: (a) the reciprocal of the product of all of the users |U| and the number of time periods m; and (b) the sum over all of the users and all of the time periods, of the event-generating rate eRate($u_i$, $t_j$) for each user $u_i$ in each time period $t_j$:

$$\text{avgERate} = \frac{1}{|U| \times m} \sum_{u_i \in U} \sum_{1 \leq j \leq m} \text{eRate}(u_i, t_j)$$

In the above formula, m is the quotient of the length of a day d and a time interval $\delta t$:

$$m = d/\delta t$$

And $t_j$ is a specific time period defined by the following formula:

$$t_j = [(j-1) \times \delta t, j \times \delta t) \text{ for } 1 \leq j \leq m$$

As shown in the formula below, eRate($u_i$, $t_j$) is the product of two terms: (a) the reciprocal of the number of days D in a time period starting at time $T_0$; and (b) the sum over all days in D of the events generated by user $u_i$ per time interval $\delta t$:

$$eRate(u_i, t_j) = \frac{1}{D} \sum_{d_h \in D} \frac{|\{\langle u_i, te_{il}, event_l(u_i)\rangle \mid te_{il} - T_0 - (h-1) \times d \in t_j\}|}{\delta t}.$$

The second term of $UtilityFC(u_j, tr_i)$ is the product of $fRate_r(u_i)$, $(tr_i - tcf_i)$, and the size of the newsfeed k divided by the size of the user's cached friend list, $flist(u_i, tcf_i)$, where $fRate_e(u_i)$ is the user's rate of removing friends. As shown in the following formula, $fRate_r(u_i)$ is the product of two terms: (a) the reciprocal of the difference between two time periods, $tff_g$ and $tff_l$, and (b) the sum of users $u_i$ removed as friends by user $u_i$ during that difference between two time periods:

$$fRate_r(u_i) = \frac{1}{tff_g - tff_1} \sum_{1 \le l \le g-1} removed_l(u_i),$$

where $$removed_l(u_i) = |\{u_j \mid u_j \in flist(u_i, tff_l) \text{ and } u_j \notin flist(u_i, tff_{l+1})\}|.$$

Below are formulas for calculating the utility measurement $UtilityEC(u_j, tr_i)$ associated with refreshing a memory-cached copy of the events generated by a friend. The following formula applies in the case where $tc_{ij}$ and $tr_i$ do not fall into the same time period $t_l$ of the day d:

$$UtilityEC(u_j, tr_i) =$$

$$eRate(u_j, t_s) \times \delta t_s + \sum_{t_l \in p \setminus \{t_s, t_e\}} eRate(u_j, t_l) \times \delta t + eRate(u_j, t_e) \times \delta t_e,$$

$$s = \left\lceil \frac{(tce_j - T_0) \bmod d}{\delta t} \right\rceil \text{ and } \delta t_s = \delta t - ((tce_j - T_0) \bmod d) \bmod \delta t,$$

and $$e = \left\lceil \frac{(tr_i - T_0) \bmod d}{\delta t} \right\rceil \text{ and } \delta t_e = ((tr_i - T_0) \bmod d) \bmod \delta t.$$

It will be appreciated that this case is illustrated by the time intervals shown on timeline 601 in FIG. 6. As shown in the formula above, $UtilityEC(u_j, tr_i)$ is the sum of two terms. The first term is the product of $eRate(u_j, t_s)$ and a time interval $\delta t_s$, where s and $\delta t_s$ are as further defined in the formula. And the second term is the sum, over all time periods in the time interval p as described above with respect to FIG. 6, of the sum of (a) the product of $eRate(u_j, t_l)$ and $\delta t$ and (b) the product of $eRate(u_j, t_e)$ and $\delta t_e$, where e and $\delta t_e$ are as further defined in the formula.

The following formula applies in the case where $tc_{ij}$ and $tr_i$ fall into the same time period $t_l$ of the day d:

Otherwise, if $tce_j$ and $tr_i$ fall into the same time interval $t_l$ of the same day, i.e., $(tce_j - T_0) \bmod d = (tr_i - T_0) \bmod d$ and $tr_i - tce_j < d$, $UtilityEC(u_j, tr_i)$ can be computed as $UtilityEC(u_j, tr_i) = eRate(u_j, t_l) \times (tr_i - tce_j),$ where $l = \left\lceil \frac{(tce_j - T_0) \bmod d}{\delta t} \right\rceil$.

As shown in the above formula, $UtilityEC(u_j, tr_i)$ in this case is the product of (a) $eRate(u_j, t_l)$ and (b) the difference between $tr_i$ and $tce_j$, where l is as further defined in the formula.

In an example embodiment, each of the rates (e.g., $fRate_a$, $fRate_r$, avgERate, eRate, etc.) described in the above paragraphs might be periodically updated nearline (near online) or offline. For example, each of the rates might be updated every 1-5 hours or every day. In another example embodiment, each of the rates described in the above paragraphs might updated approximately in realtime when a request for a newsfeed is made by a user, e.g., using functionality such as Dremel for accessing structured/indexed big data.

Figure 7:
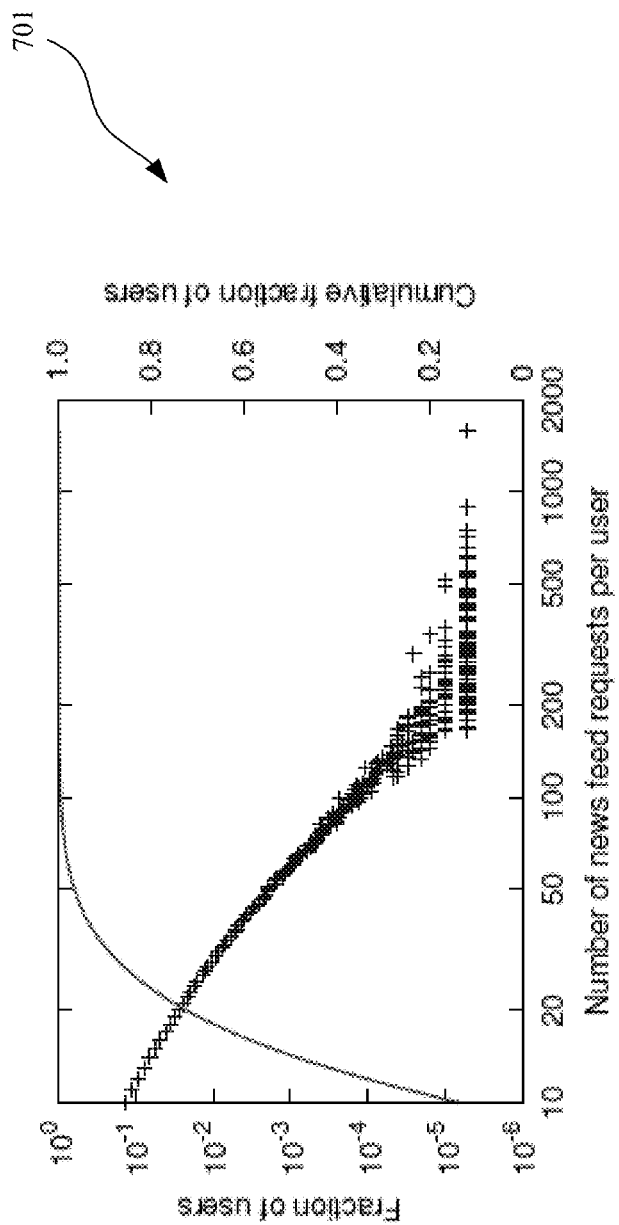
FIG. 7 is a graph showing the number of newsfeed requests per user at a website hosting online content aggregation, in accordance with an example embodiment.

FIG. 7 is a graph showing the number of newsfeed requests per user at a website hosting online content aggregation, e.g., Yahoo! News. The graph 701 in this figure shows the number of newsfeed requests per user during one month, e.g., February 2012. Graph 701 and the other graphs described below are based on simulation experiments conducted on user logs maintained by Yahoo! News. As shown in graph 701 the vast majority of users issue 20 or fewer newsfeed requests in one month. Given this fact, a "pull" approach to generating a newsfeed (e.g., as depicted in FIGS. 3 and 5) might be relatively more efficient than a "push" approach to generating a newsfeed (e.g., where the newsfeed is materialized in advance of any user request for a newsfeed).

Figure 8:
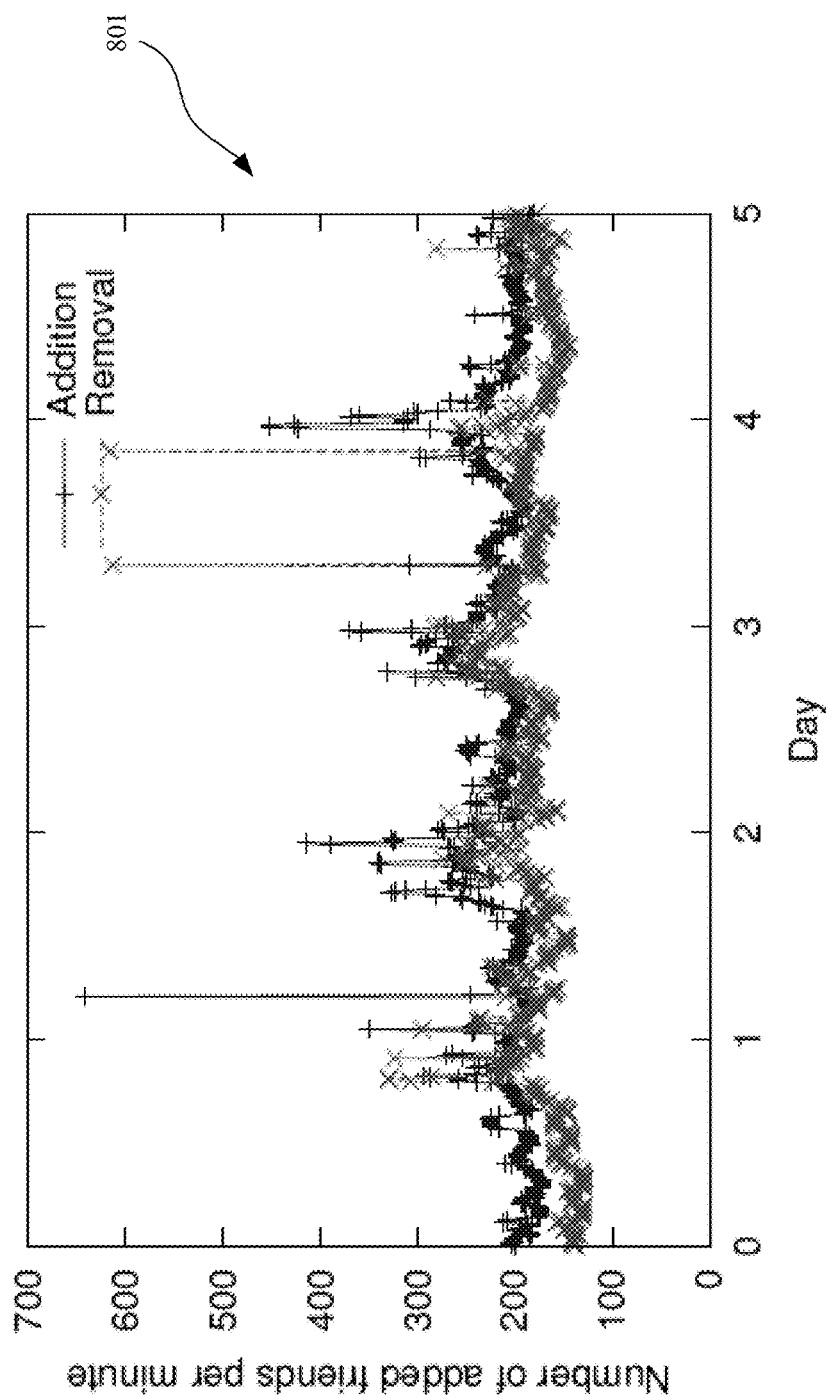
FIG. 8 is a graph showing the number of friends added and removed at a website hosting online content aggregation, in accordance with an example embodiment.

FIG. 8 is a graph showing the number of friends added and removed at a website hosting online content aggregation, e.g., Yahoo! News. The graph 801 in this figure shows the total number of friends added (plotted with + symbols) and removed (plotted with x symbols) per minute by all users of the website, during a 5-day period. It will be appreciated that these numbers in graph 801 are relatively stable, which tends to corroborate the use of the utility measurement described in operation 502 of FIG. 5.

Figure 9:
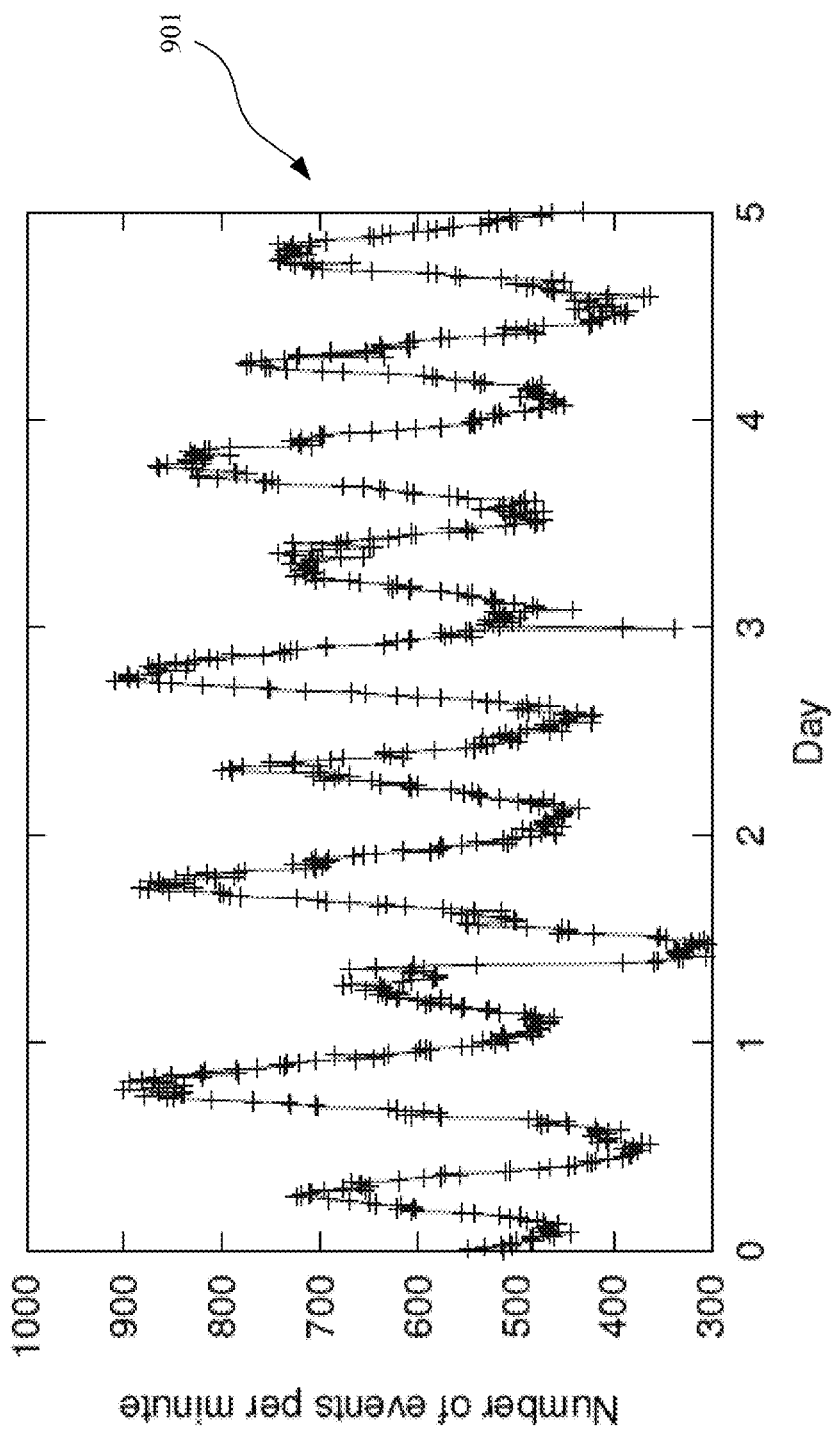
FIG. 9 is a graph showing the number of events generated per minute by the users at a website hosting online content aggregation, in accordance with an example embodiment.

FIG. 9 is a graph showing the number of events generated per minute by the users at a website hosting online content aggregation, e.g., Yahoo! News. The graph 901 in this figure shows the total number of events generated per minute by all users of the website, during a five-day period. As used in this graph, an event occurs when a user reads an article displayed in the website's newsfeed. Here again, it will be appreciated that the numbers in graph 901 are relatively stable, which tends to corroborate the use of the utility measurement described in operation 503 of FIG. 5.

Figure 10:
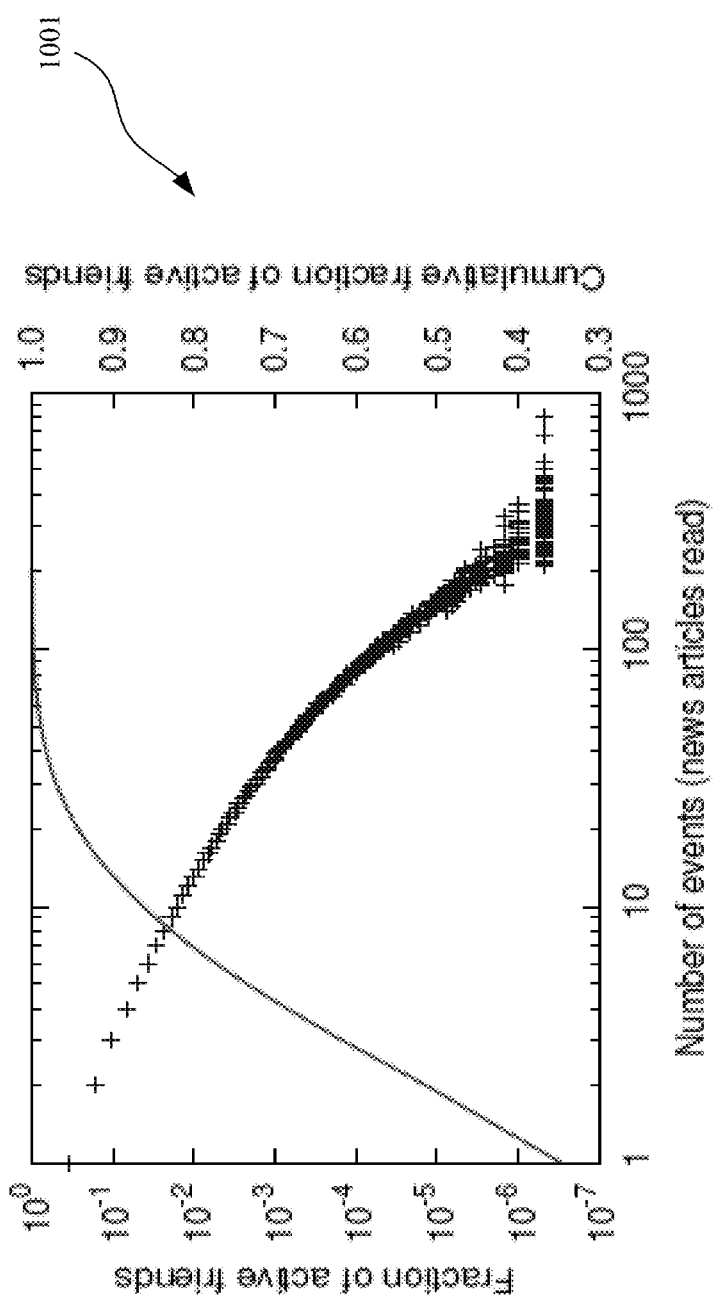
FIG. 10 is a graph showing the number of events generated by active friends at a website hosting online content aggregation, in accordance with an example embodiment.

FIG. 10 is a graph showing the number of events generated by active friends at a website hosting online content aggregation, in accordance with an example embodiment. The graph 1001 in this figure shows the total number of news articles read during one month, e.g., February 2012, by the active users of the website expressed as a fraction. As used in this graph, an event occurs when a user reads an article displayed in the website's newsfeed. It will be appreciated that a sizable fraction of active users read only one article. In an example embodiment, such active users are included in the calculation of the utility measurement described in operation 503 of FIG. 5. In an alternative example embodiment, such active users might be excluded from that calculation.

Figure 11:
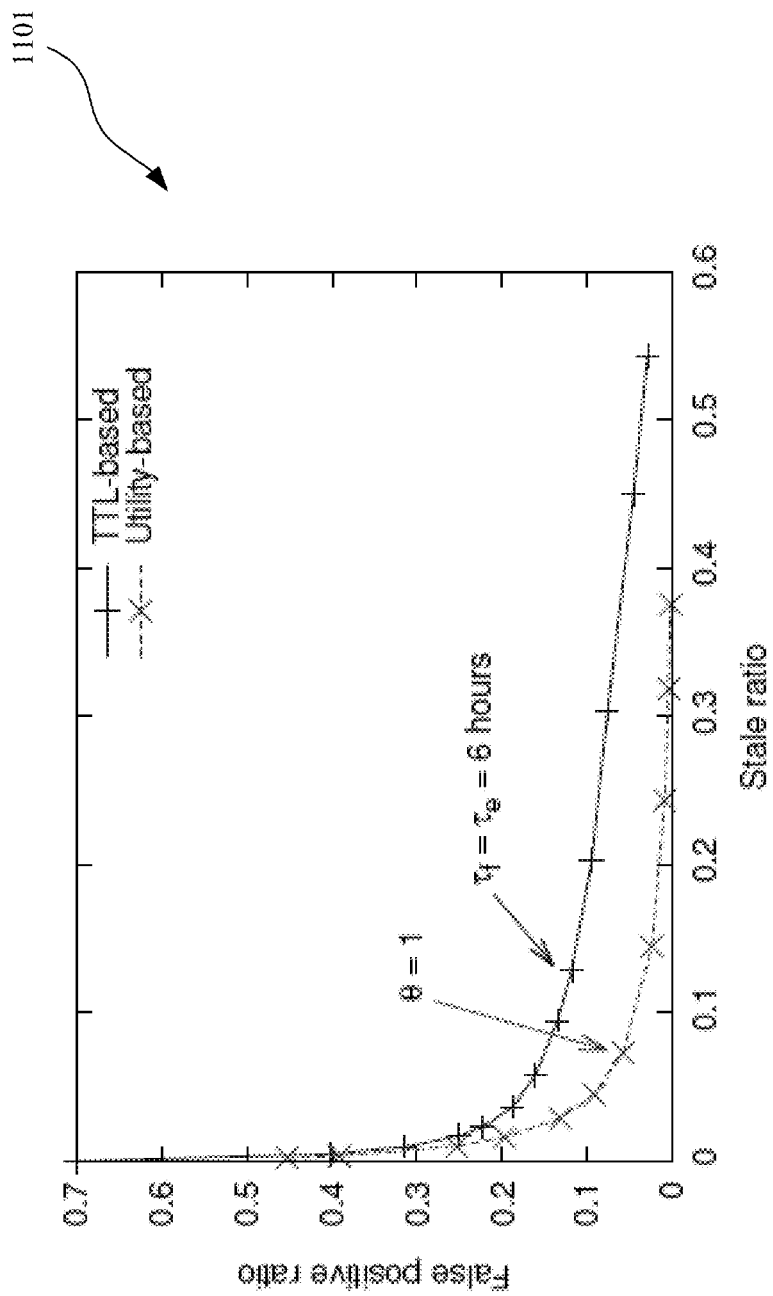
FIGS. 11 and 12 are graphs showing a comparison of a TTL-based refreshing approach and a utility-based refreshing approach with respect to stale ratio and false positive ratio, in accordance with an example embodiment.
Figure 12:
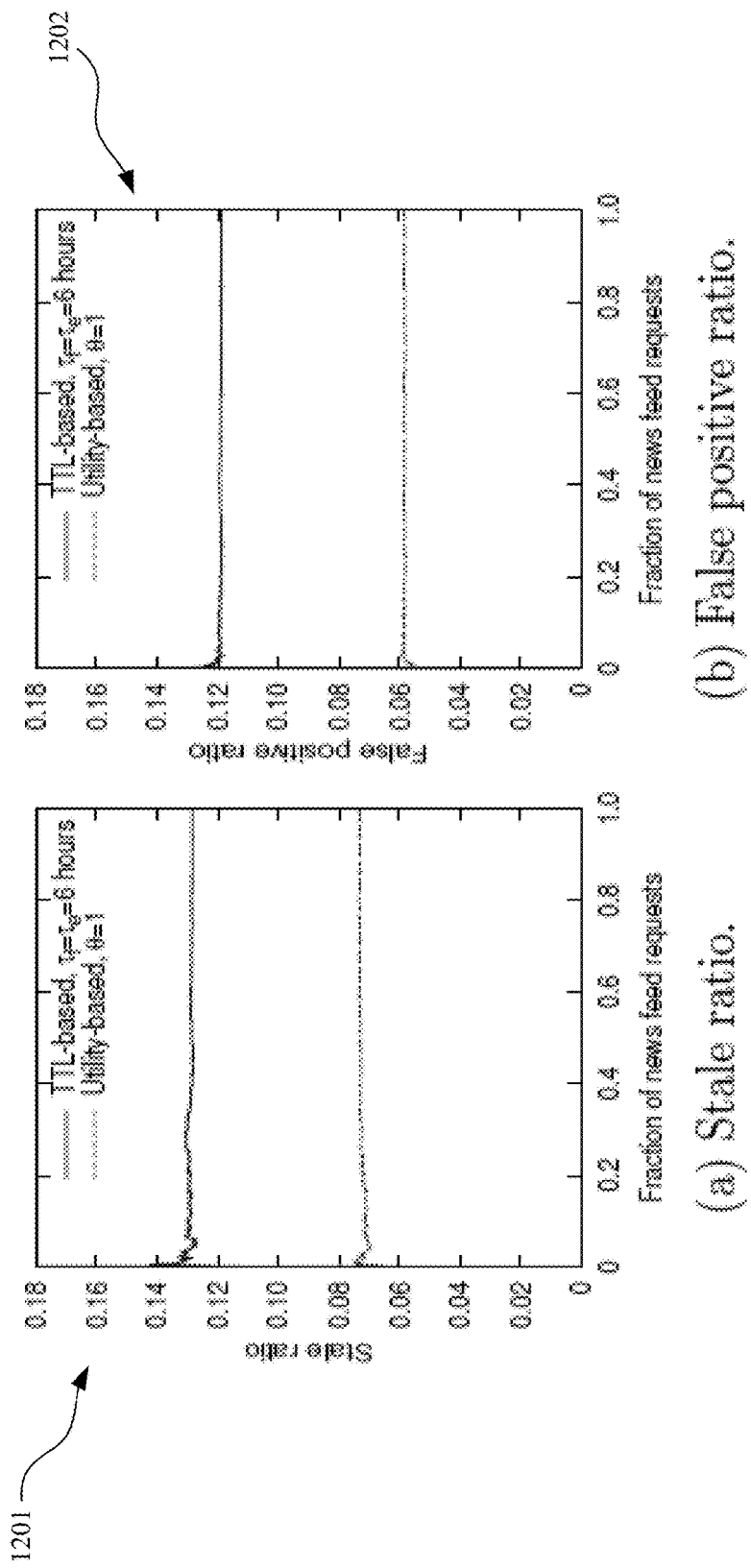

FIGS. 11 and 12 are graphs showing a comparison of a TTL-based refreshing approach and a utility-based refreshing approach with respect to stale ratio and false positive ratio, in accordance with an example embodiment. The graph 1101 in FIG. 11 shows that the utility-based approach (plotted with x symbols) to cache-refreshing, e.g., as described in FIG. 5, tends to outperform the TTL-based approach (plotted with + symbols) to cache-refreshing, e.g., as described in FIG. 3. In graph 1101, performance is measured both in terms of false-positive ratio and stale (or false-negative) ratio. A cache-refreshing operation is the result of a false positive when the newsfeed before the cache-refreshing operation is the same as the newsfeed after the cache-refreshing operation. A cache-refreshing operation is the result of a false negative when the newsfeed generated from the in-memory cache differs from a newsfeed that would be generated from a persistent data store at the same point in time. It will be appreciated that performance is relatively better when the false-positive ratio is relatively lower. Similarly, performance is relatively better when the stale (or false-negative) ratio is relatively lower.

In FIG. 12, graph 1201 shows a comparison a TTL-based refreshing approach and a utility-based refreshing approach with respect to stale ratio (or false negative) over time as expressed a fraction of newsfeed requests. Here again, the utility-based approach to cache-refreshing, e.g., as described in FIG. 5, tends to outperform the TTL-based approach to cache-refreshing, e.g., as describe in FIG. 3. The same is also true of graph 1202, which shows a comparison a TTL-based refreshing approach and a utility-based refreshing approach with respect to false-positive ratio over time as expressed a fraction of newsfeed requests.

Figure 13:
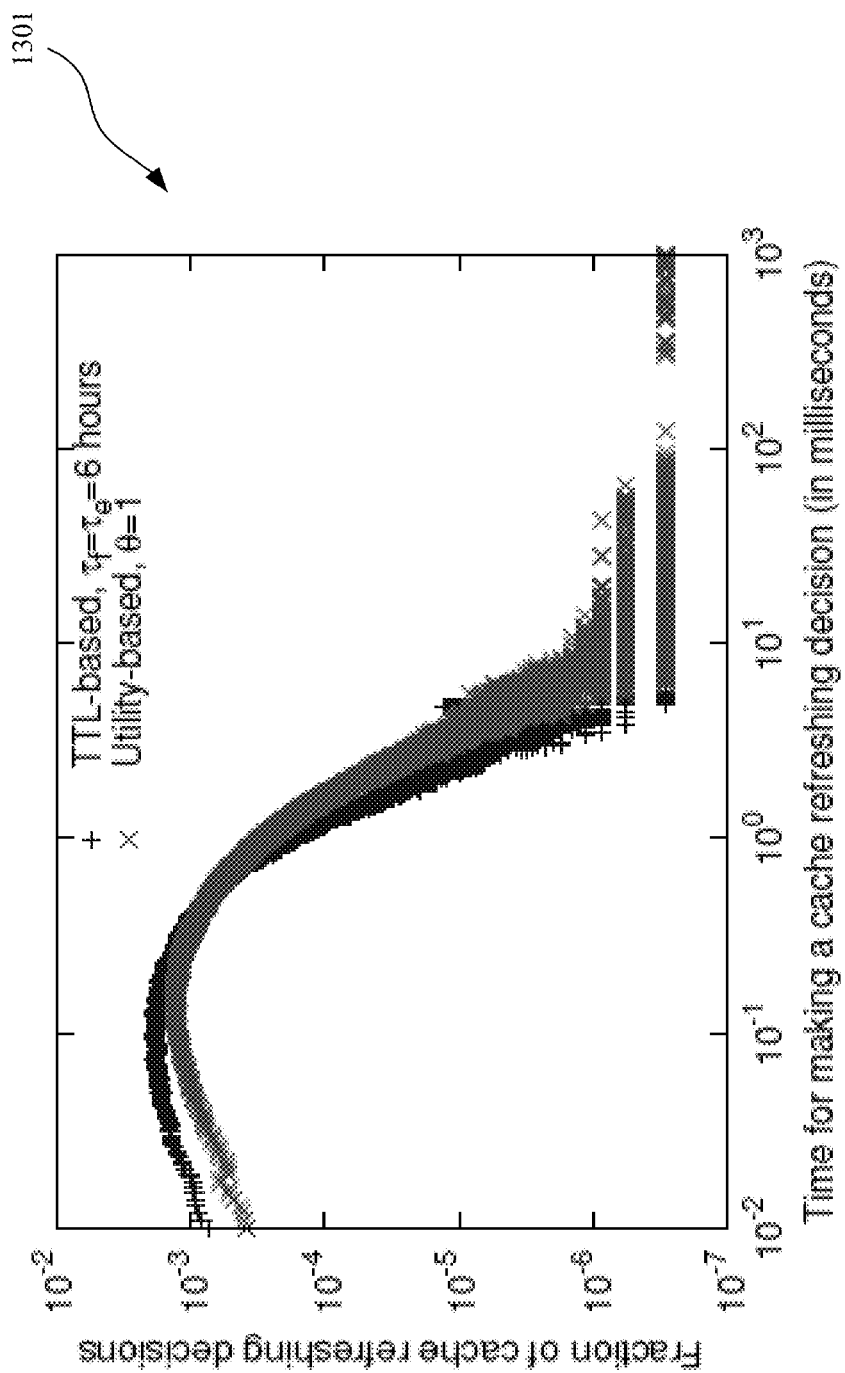
FIG. 13 is a graph showing a comparison of a TTL-based refreshing approach and a utility-based refreshing approach with respect to time for making a refreshing decision, in accordance with an example embodiment.

FIG. 13 is a graph showing a comparison of a TTL-based refreshing approach and a utility-based refreshing approach with respect to time for making a refreshing decision, in accordance with an example embodiment. As shown by graph 1301 in this figure, the TTL-based refreshing approach (plotted with + symbols) performs slightly better in terms of efficiency (e.g., takes less time to determine whether to refresh or not) than the utility-based refreshing approach (plotted with x symbols), since the former approach involves less computation than the latter approach.

Figure 14:
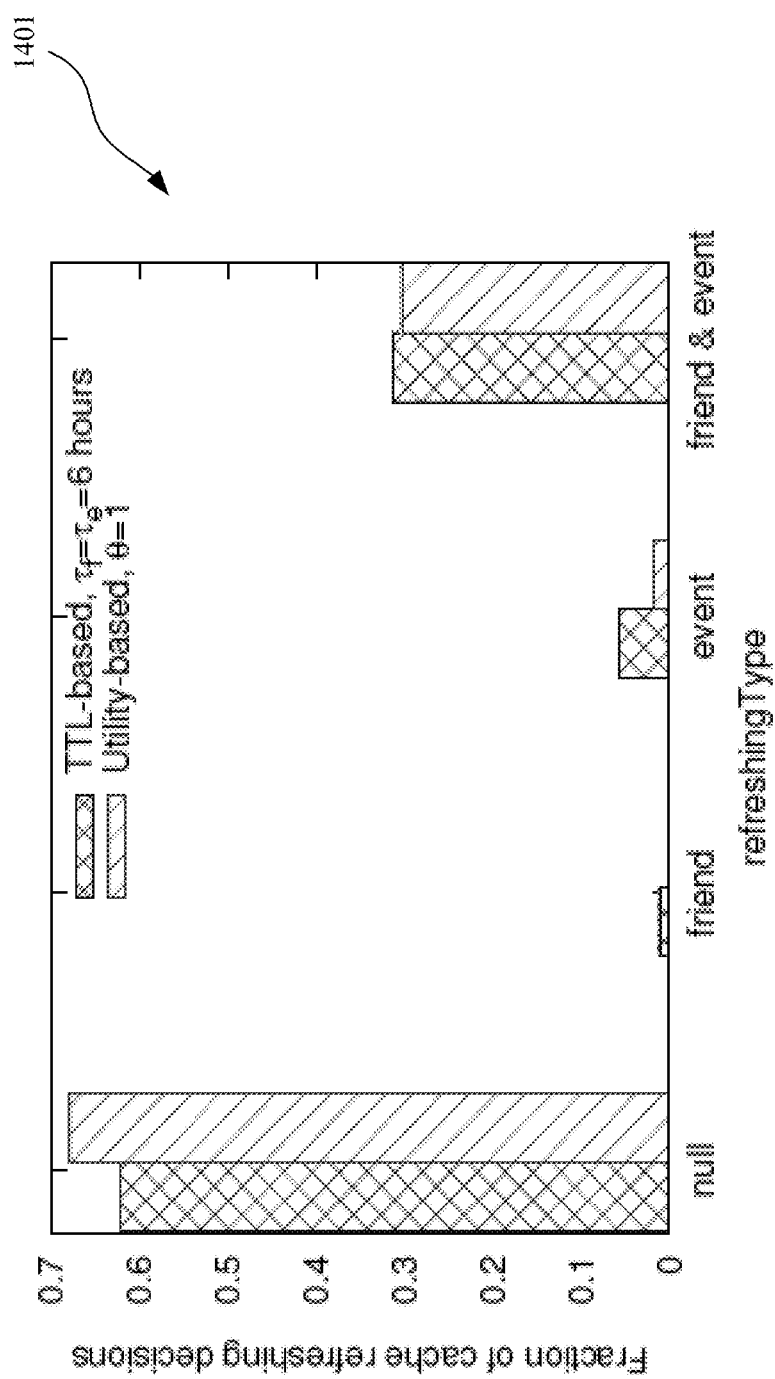
FIG. 14 is a graph showing a comparison of a TTL-based refreshing approach and a utility-based refreshing approach with respect to refreshing type, in accordance with an example embodiment.

FIG. 14 is a graph showing a comparison of a TTL-based refreshing approach and a utility-based refreshing approach with respect to refreshing type, in accordance with an example embodiment. As depicted by graph 1401 in this figure, a refreshing type can be null, friend, event, or friend and event. If the refreshing type is null, that means that there was a cache hit, e.g., the newsfeed could be generated from the entries in the friendship cache and the event cache. If the refreshing type is friend, the friendship cache was refreshed by the cache-refreshing module prior to generating the newsfeed. If the refreshing type is event, the event cache was refreshed by the cache-refreshing module prior to generating the newsfeed. And if the refreshing type is friend and event, the both caches were refreshed by the cache-refreshing module prior to generating the newsfeed. As shown in graph 1401, the utility-based refreshing approach had relatively more cache hits and relatively fewer cache misses than the TTL-based refreshing approach. It will be appreciated that a cache miss results in a significant decrease in overall efficiency since data is retrieved from slow persistent storage (e.g., flash memory or a hard drive) rather than fast memory (main memory or RAM).

Returning to FIG. 1, personal computer 102 and the servers at websites 104 and 106 might include (1) hardware consisting of one or more microprocessors (e.g., from the x86 family, the ARM family, or the PowerPC family), volatile storage (e.g., RAM), and persistent storage (e.g., flash memory, a hard disk, or a solid-state drive), and (2) an operating system (e.g., Windows, Mac OS, Linux, Windows Server, Mac OS Server, etc.) that runs on the hardware. Similarly, in an example embodiment, mobile device 103 might include (1) hardware consisting of one or more microprocessors (e.g., from the ARM family or the x86 family), volatile storage (e.g., RAM), and persistent storage (e.g., flash memory such as microSD) and (2) an operating system (e.g., iOS, webOS, Windows Mobile, Android, Linux, Symbian OS, RIM BlackBerry OS, etc.) that runs on the hardware.

Also in an example embodiment, personal computer 102 and mobile device 103 might each include a browser as an application program or as part of an operating system. Examples of browsers that might execute on personal computer 102 include Internet Explorer, Mozilla Firefox, Safari, and Google Chrome. Examples of browsers that might execute on mobile device 103 include Safari, Mozilla Firefox, Android Browser, and webOS Browser. It will be appreciated that users of personal computer 102 and/or mobile device 103 might use browsers (e.g., through a graphical user interface or GUI) to access content presented by website 104 or website 106. Alternatively, users of personal computer 102 and/or mobile device 103 might use application programs or applets to access content presented by website 104 or website 106.

With the above embodiments in mind, it should be understood that the inventions might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. For example, a hybrid cache-refreshing module might use both a TTL measurement and a utility measurement, as described above, when refreshing the in-memory cache from the persistent data store. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method, comprising the operations of:
receiving, at one or more servers, a request for a newsfeed from a user device of a user of an online social service, wherein the newsfeed depends at least in part on a memory-cached list of social friends of the user and on a memory-cached list of events associated with each social friend;
refreshing a memory-cached copy of the list of social friends from a corresponding list in a persistent data store, based upon a determination of a utility associated with the user;
determining a respective utility associated with each social friend of the list of social friends, the respective utility is based on a calculation of a rate of generation of events by said each social friend, wherein the calculation of the rate of generation of events by said each social friend is based on a sum of a number of events generated by said each social friend divided by a period of time;
for said each social friend, refreshing a memory-cached copy of a list of events associated with said each social friend from a corresponding list of events in a persistent data store, based upon a the respective utility as calculated for said each social friend;
generating the newsfeed based on the refreshed memory-cached copy of the list of social friends and based on the refreshed memory-cached copy of the list of events associated with said each social friend; and
sending, from the one or more servers, the newsfeed to be displayed on a display associated with the user device of the user, wherein each operation of the method is executed by one or more processors.

2. The method of claim 1, wherein the events include posted text, hyperlinks, images, videos, or audio recordings.

3. The method of claim 1, wherein the utility associated with the user further depends at least in part on a rate of addition of social friends by the user.

4. The method of claim 3, wherein the rate of addition is periodically updated.

5. The method of claim 1, wherein the utility associated with the user further depends at least in part on a rate of removal of social friends by the user.

6. The method of claim 5, wherein the rate of removal is periodically updated.

7. The method of claim 1, wherein the rate of generation is periodically updated.

8. The method of claim 1, wherein the utility associated with the social friend further depends at least in part on a time interval in which an event was generated by the social friend.

9. A computer-readable storage medium that is non-transitory and that stores a program, wherein the program, when executed, instructs a processor to perform the following operations: receive, at one or more servers, a request for a newsfeed from a user device of a user of an online social service, wherein the newsfeed depends at least in part on a memory-cached list of social friends of the user and on a memory-cached list of events associated with each social friend; refresh a memory-cached copy of the list of social friends from a corresponding list in a persistent data store, based upon a determination of a utility associated with the user; determine a respective utility associated with each social friend of the list of social friends, the respective utility is based on a calculation of a rate of generation of events by said each social friend, wherein the calculation of the rate of generation of events by said each social friend is based on a sum of a number of events generated by said each social friend divided by a period of time; for said each social friend, refresh a memory-cached copy of a list of events associated with the each social friend from a corresponding list of events in a persistent data store, based upon a the respective utility as calculated for said each social friend; generating the newsfeed based on the refreshed memory-cached copy of the list of social friends and based on the refreshed memory-cached copy of the list of events associated with said each social friend; and sending, from the one or more servers, the newsfeed to be displayed on a display associated with the user device of the user.

10. The computer-readable storage medium of claim 9, wherein the events include posted text, hyperlinks, images, videos, or audio recordings.

11. The computer-readable storage medium of claim 9, wherein the utility associated with the user further depends at least in part on a rate of addition of social friends by the user.

12. The computer-readable storage medium of claim 11, wherein the rate of addition is periodically updated.

13. The computer-readable storage medium of claim 9, wherein the utility associated with the user depends at least in part on a rate of removal of social friends by the user.

14. The computer-readable storage medium of claim 13, wherein the rate of removal is periodically updated.

15. The computer-readable storage medium of claim 9, wherein the rate of generation is periodically updated.

16. The computer-readable storage medium of claim 9, wherein the utility associated with the social friend depends at least in part on a time interval in which an event was generated by the social friend.

17. A method, comprising the operations of: receiving, at one or more servers, a request for a newsfeed from a user device of a user of an online social service, wherein the newsfeed depends at least in part on a memory-cached list of social friends of the user and on a memory-cached list of events associated with each social friend; refreshing a memory-cached copy of the list of social friends from a corresponding list in a persistent data store, based at least in part on a rate of addition of friends by the user and a rate of removal of friends by the user; determining a respective utility associated with each social friend of the list of social friends, the respective utility is based on a calculation of a rate of generation of events by said each social friend, wherein the calculation of the rate of generation of events by said each social friend is based on a sum of a number of events generated by said each social friend divided by a period of time; for said each social friend, refreshing a memory-cached copy of a list of events associated with said each social friend from a corresponding list of events in a persistent data store, based upon the respective utility as calculated for said each social friend; generating the newsfeed based on the refreshed memory-cached copy of the list of social friends and based on the refreshed memory-cached copy of the list of events associated with the social friend; and sending, from the one or more servers, the newsfeed to be displayed on a display associated with the user device of the user, wherein each of the rates is periodically updated and each operation of the method is executed by one or more processors.

18. The method of claim 17, wherein each of the rates is periodically updated.

* * * * *